Figure 1:
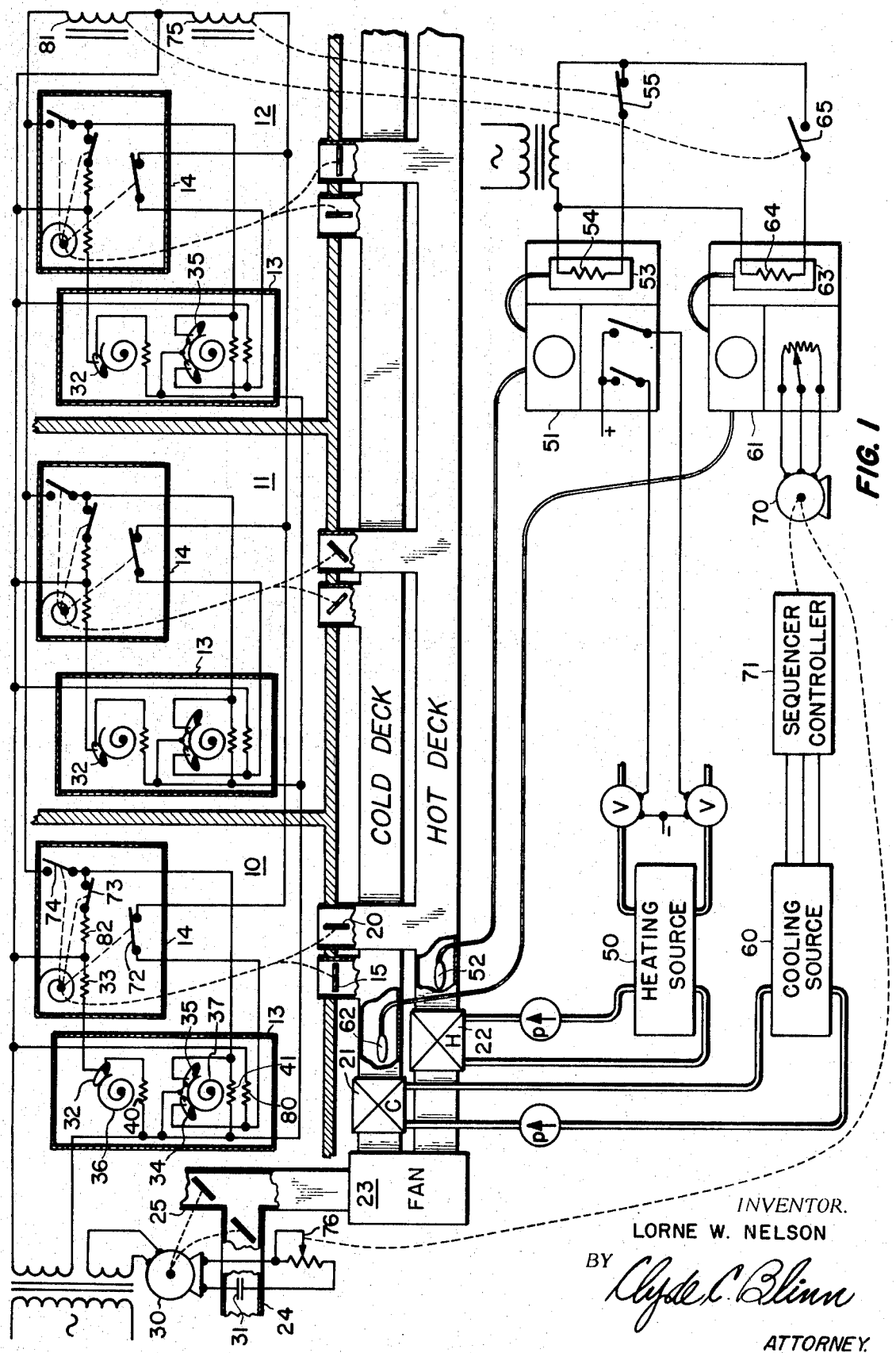

United States Patent

[11] 3,567,115

| [72] | Inventor | Lorne W. Nelson<br>Bloomington, Minn. |
|---|---|---|
| [21] | Appl. No. | 825,899 |
| [22] | Filed | May 19, 1969 |
| [45] | Patented | Dec. 7, 1970 |
| [73] | Assignee | Honeywell Inc.<br>Minneapolis, Minn. |

[54] ZONE TEMPERATURE CONTROL SYSTEM
9 Claims, 2 Drawing Figs.

[52] U.S. Cl. .................................................. 236/1,
236/68, 165/22
[51] Int. Cl. ................................................... F24f 3/08
[50] Field of Search .......................................... 236/1 (B),
9, 9 (A), 10, 11; 165/22

[56] References Cited
UNITED STATES PATENTS

| 2,188,775 | 1/1940 | Locke | 236/1B |
| 2,286,296 | 6/1942 | McGrath | 236/9AX |
| 2,329,636 | 9/1943 | McGrath | 236/9AX |
| 3,158,319 | 11/1964 | Nelson | 236/9A |
| 3,482,623 | 12/1969 | Betz | 165/22 |

Primary Examiner—Edward J. Michael
Attorneys—Lamont B. Koontz, Francis A. Sirr and Clyde C. Blinn ABSTRACT: A zone temperature control system having a thermostat in each zone for controlling a supply of temperature changing medium to that zone. The thermostat having a first electrical output for modulatingly controlling the flow of medium to its zone and a second electrical output which can be selected when that zone has the greatest conditioning load to modulatingly control the temperature of the medium delivered to the plurality of zones from a central source.

ZONE TEMPERATURE CONTROL SYSTEM

BACKGROUND FOR THE INVENTION

In a zone temperature control system wherein each zone has its individual air flow control apparatus, an optimum operating condition takes place when the temperature of the air being supplied from the central source is sufficient to just maintain a maximum flow of air to the zone having the greatest load.

In the Benard K. Betz application, U.S. Ser. No. 707,686, now U.S. Pat. 3,482,623, the temperature of the air being supplied to the system is controlled by an end switch on a zone damper which is controlled by a zone thermostat whereby the temperature of the air is maintained to keep the damper of one of a plurality of zones near a wide open position.

In the Joseph E. Hogel application, U.S. Ser. No. 808,161, each zone of a zone temperature control system has a zone thermostat with two ranges of output. Each zone thermostat is connected to control the zone damper in one range of output. The temperature of the air supplied from the central source is controlled by the second output of the zone thermostat of the zone having the greatest load.

SUMMARY OF THE INVENTION

The present invention is concerned with a zone temperature control system for maintaining an optimum operation. Each zone has a thermostat with two electrical outputs. The thermostat of each zone is electrically connected so one output controls the zone damper motor which adjusts the flow of air to its zone. The second electrical output of the zone thermostat having the greatest load is connected to control the temperature of the air being delivered to all the zones from a central source. DESCRIPTION OF THE FIGURES FIG. 1 is a zone temperature control system wherein the zone thermostat comprises a plurality of switch means for controlling the zone damper motor and the temperature of the air supplied from the central source.

Figure 2:
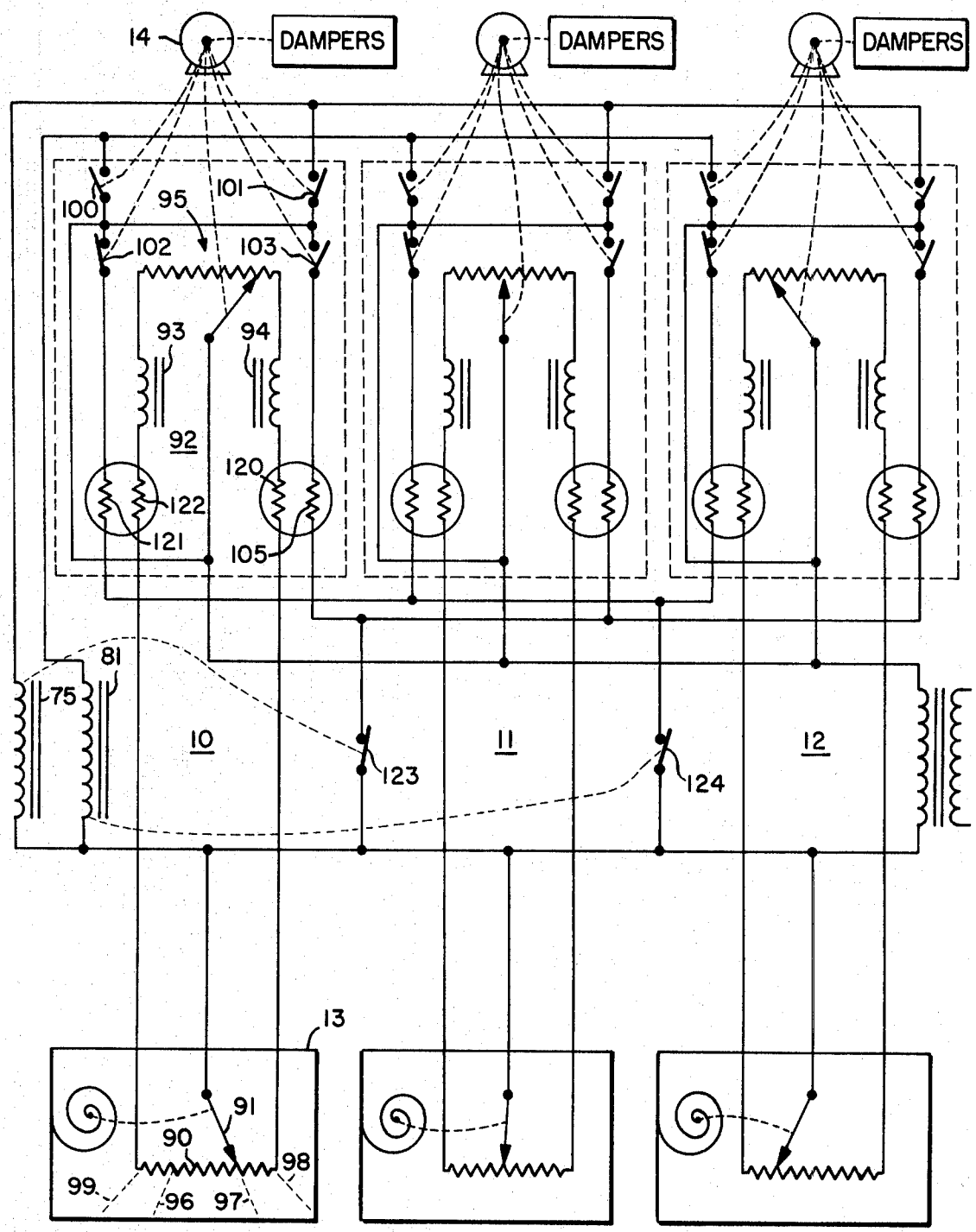

FIG. 2 is a second embodiment of a zone temperature control system comprising zone thermostats which are made of variable resistors for adjusting a balanceable network controlling the damper motors and having a second output for controlling the temperature of the air from the central source.

DESCRIPTION OF FIG. 1

The zone temperature or physical condition control system of FIG. 1 is for controlling the air temperature or condition of a medium in a plurality of zones 10, 11 and 12, each of which has a condition sensing means or zone thermostat 13, and a damper motor 14 which is connected to control a pair of dampers or flow control devices 15 and 20 in the cold and hot supply ducts to the zone. The ducts are connected to a central source of conditioned medium having two separate sources for heating and cooling the air, the cooling is accomplished by the heat exchanger or cooling coil 21 in the cold duct or deck and the heating is accomplished by the heat exchanger or heating coil 22 in the hot duct or deck. Air is forced through the exchangers to the zones by a circulating means or fan 23. The fan receives outdoor air or return air through ducts 24 and 25 respectively depending upon the positions of the dampers connected to motor 30 which is positioned in response to an enthalpy control 31 in the outdoor air duct.

Thermostat 13 which has a plurality of electrical outputs or switches comprises a damper switch 32 which is controlled by a temperature responsive element or bimetal 36 and is connected to energize a heater 33 of bimetal operated damper motor 14. Depending upon the percent on time of switch 32 or the deviation range between the sensed temperature and the desired or set point temperature which is indicative of the load of the zone, the position of motor 14 modulates from one extreme to the other. As shown, switch 32 is closed 100 percent of the time and damper motor 14 of zone 10 is in one extreme position to open the hot damper 20 and close the cold damper 15. Thermostat 13 has a heating switch 34 and a cooling switch 35 which are connected to temperature responsive means or bimetal 37. The percent on time of switches 34 and 35 depend upon the deviation range between the sensed temperature and the desired temperature in the zone which is indicative of the load of the zone. Switch 34 is connected for controlling the heating source and switch 35 is connected for controlling the cooling source.

The thermostat is calibrated so that switch 32 is effective to modulatingly operate damper motor 14 so the hot damper 20 is in a fully open position before switch 34 closes to operate the heating source and switch 32 is effective to operate damper motor 14 so the cold damper 15 is in a fully open position before switch 35 closes to operate the cooling source. Such an operation is accomplished by one skilled in the art by the calibration of the thermostat and by the adjustment of the effect of heat anticipation heaters 40 and 41 so the percent closed time of the switches varies with the temperature conditioning load in zone 10.

A conventional heating source 50 is connected to heat exchanger 22. Source 50 is controlled by a source control means or temperature controller 51 having a first temperature responsive bulb 52 located in the outlet duct of heat exchanger 22 and a second temperature responsive bulb 53 which is heated by heater 54 when switch 55 is closed to reset the control point of controller 51 in a conventional manner as shown in the Lorne W. Nelson U.S. Pat. No. 3,158,319. Specifically, controller 51 controls two valves of the heating source.

A conventional cooling source 60 is connected to heat exchanger 21. Source 60 is controlled by a source control means or temperature controller 61 having a temperature responsive bulb 62 in the outlet duct of heat exchanger 21 and a second temperature responsive bulb 63 which is heated by heater 64 when switch 65 is closed to reset the control point of controller 61 similar to controller 51. Specifically, controller 61 controls motor 70 which adjusts a sequencer controller 71 for selectively energizing a plurality of refrigeration stages in cooling source 60. Motor 70 also adjusts potentiometer 76 and thus the proportion of return air and outdoor air delivered to the system when the enthalpy control 31 is closed to make use of outdoor air for cooling before cooling source 60 is energized.

Damper motor 14 has a plurality of switches associated therewith. Switch 72 is closed when the damper motor is in a position to have heating damper 20 almost wide open. Switches 73 and 74 are connected to operate together so that switch 73 is open and switch 74 is closed when the damper motor is in a position so that cooling damper 15 is almost wide open. When any one of the damper motors 14 is fully open in a heating direction and switch 72 is closed, a further drop in the zone temperature to close heating switch 34 will result in the energization of relay 75 which opens switch 55 to reset the hot deck temperature upward. Simultaneously, the closure of switch 34 energizes heater 80 to provide heat anticipation to the bimetal associated with switch 34. Switch 34 also controls the energization of heater 80 in each of the other zone thermostats through switches 72 to result in a bias signal by the artificial heating of the other zone thermostats in a direction to allow the first thermostat which calls for a change in the temperature of the air from the heating source to take over control.

During the cooling operation, after damper motor 14 is fully deenergized so that cooling damper 15 is wide open, any further increase in the space temperature results in the closure of cooling switch 35 to energize relay 81 through switch 74. Relay 81 closes switch 65 to reset the cold deck temperature downward. Resistor 82 which is connected in series with switch 73 provides a dummy load should the damper switch 35 close before damper motor 14 is in the cool position and relay 81 is not yet connected to switch 35 through switch 74.

OPERATION OF FIG. 1

Assuming that fan 23 is operating and air is being forced through cooling coil 21 and heating coil 22, the distribution of air to each of the zones is accomplished by the position of the dampers, in the hot and cold deck outlets, which are controlled by damper motors 14. As shown, the heating load of zone 10 is such that switch 32 is closed 100 percent of the time and damper motor 14 has positioned heating damper 20 wide open. Assume that the thermostat 13 is satisfied in zone 10 under this condition and that switch 34 is open. Thermostat 13 of zone 11 is satisfied by an operation of switch 32 in a closed position 50 percent of the time so that damper motor 14 is energized to have the heating and cooling dampers half way open. Zone 12 is satisfied with the switch 32 open 100 percent of the time and damper motor 14 is deenergized to have the cooling damper wide open.

As the heating load of zone 10 increases and the deviation between the desired control point and the actual temperature of thermostat increases, heating switch 34 closes to energize relay 75 to result in the deenergization of heater 54. The control point of bulb 52 of controller 51 is reset to increase the temperature of the air leaving heat exchanger 22 to be delivered to the hot deck. The amount of resetting of controller 51 depends upon the percent on time of heating switch 34 which would cycle as the temperature responsive element received artificial heat from the heater 80. As soon as switch 34 closed and thermostat 13 began to control the resetting action of controller 51, the artificial heat supplied to the other thermostats by heaters 80 through switch 72 would tend to bias these thermostats to keep thermostat 13 in control of controller 51 in a manner similar to the Elmer A. Carlson U.S Pat. No. 3,206,120. As the temperature of air in the hot deck increased, the heating load of zone 10 would be satisfied. If the heating load of zone 11 remained the same, damper switch 32 of zone 11 readjusts the position of the dampers to close the heating damper and open the cooling damper. By means of this operation, the temperature of the hot deck is continually reset at a level to maintain the hot deck air temperature sufficient to satisfy the heating load of the zone having the greatest heating load. The remaining zones which have a lesser heating load are adjusted to receive the amount of air needed to satisfy their particular loads. If the temperature in zone 10 increases until the deviation between the desired control point and the actual thermostat temperature drops to a level to cause heating switch 34 to open, controller 51 is reset to reduce the temperature of the air in the hot deck. At any time, if the heating load of another zone becomes greater, the thermostat or heating switch 34 of that zone would take over the primary control of controller 51.

Simultaneously, the air temperature of the cold deck is adjusted to maintain the temperature at an optimum operating temperature. If the space temperature of zone 12 should continue to increase, that is the cooling load increases and the load cannot be satisfied when the cooling damper is wide open as shown, cooling switch 35 closes to energize relay 81 and to reset the control point of controller 61 to decrease the cold deck temperature to satisfy the cooling load of zone 12.

DESCRIPTION OF FIG. 2

FIG. 2 is a schematic diagram of the circuit for a plurality of thermostats and damper motors for the zone temperature control system as disclosed in FIG. 1. The circuit for the thermostat and damper motor of each zone is shown as a modification of the circuit for zones 10, 11 and 12 of FIG. 1. Referring to the circuit which is used for zone 10, the thermostat 13 has a resistor 90 over which a movable wiper 91 is adjusted by a temperature responsive element or a bimetal. Thermostat 13 is connected to control damper motor 14 by means of a network circuit 92 having a pair of relays 93 and 94 which are operated when the network circuit having the rebalance potentiometer 95 is unbalanced to control the operation of motor 14. A network circuit of this type is quite conventional and is shown in one form in the Daniel G. Taylor U.S. Pat. No. 2,028,110.

Motor 14 is connected to control the dampers 15 and 20 for the respective zones as shown in FIG. 1. Connected to be operated by motor 14 are a plurality of switches in the network circuit 92. Switches 100 and 101 are end switches, switch 100 is closed when motor 14 is almost in one extreme position and switch 101 is closed when the motor is almost in the other extreme position. Switches 102 and 103 are operated together as a SPDT switch when the damper motor is in a partially operated position on either one or the other side of the center position.

When the damper motor moves in one extreme direction to close switch 101, the relay 75 is energized to reset the temperature of the hot deck, and when the damper motor moves to the other extreme position, switch 100 is closed to energize relay 81 for resetting the cold deck temperature.

Network circuit 92 is adjusted whereby damper motor 14 is operated from one position to the other through an intermediate range of movement of wiper 91 on resistance 90 as the space temperature changes as shown by the dotted lines 96 and 97.

When wiper 91 is moved beyond the intermediate range in one direction or the other, motor 14 closes either the heating switch 101 or the cooling switch 100. Then wiper 91 moves in the range beyond the intermediate range such as in the range between dotted lines 97 and 98, switch 101 is closed, switch 103 being previously closed and the range between 97 and 98 is the thermostat droop for operating relay 75 between full off and full on. Similarly, range 96 to 97 is for the cooling operation.

Depending upon the direction of unbalance of network circuit 92, motor 14 will move in one direction or the other. Assuming that the motor moves in a direction to close switch 103, a heater 105 associated with a negative temperature responsive element or resistor 120 in the network circuit will be energized through switch 123 closed by heating relay 75 to result in an unbalance of the network circuit in a direction to artificially satisfy thermostat 13 in a manner similar to the Lester N. Bolmgren U.S. Pat. No. 3,075,130. Upon the operation of damper motor 14 in the direction for cooling, heater 121 will artificially heat a negative temperature responsive element or resistor 122 in the network circuit upon closure of switch 124 of cooling relay 81. When any one of the heaters 105 or 121 is energized by the operation of the switches 100 and 101, the heaters in the other network circuits for zones 11 and 12 are also operated to effectively bias the thermostats if the zone damper motors are in a position to close their respective switches 102 and 103.

OPERATION OF FIG. 2

Assuming that the circuit of FIG. 2 was used in a system as shown in FIG. 1, the relative position of each of the thermostats in FIG. 2 is such that the damper motors 14 would position the hot deck damper of zone 10 wide open, the hot and cold deck dampers of zone 11 in their midposition, and the cold deck damper of zone 12 in the wide open position.

Upon a further increase in the heating load of zone 10, thermostat 13 moves beyond the intermediate range of wiper 91 to move damper motor 14 slightly farther to close switch 101 resulting in the energization of the hot deck relay to reset the control point of controller 51 of FIG. 1 and thus increase the hot deck temperature. As the temperature of the hot deck increases, the damper motor of zone 11 would readjust to allow the correct portions of hot and cold deck air to enter the zone and the hot deck damper of zone 12 would remain closed.

As the space temperature decreases and the wiper 91 moves beyond the intermediate range 96 to 97, the extent of movement in range 97 to 98 determines the percent "on" time of heating relay 75 and thus the amount of upward reset of the hot deck temperature. When wiper 91 is at one extreme position such as 98, network circuit 92 would maintain heating relay continuously energized.

I claim:

1. A system for controlling a physical condition in a plurality of zones, comprising:
    a first source of medium capable of effecting a change in the condition;
    first circulating means for circulating the medium to the zones;
    condition sensing means in each zone for sensing the condition in that zone and providing two outputs in accordance with the deviation between the sensed condition and a desired condition in that zone, said outputs depending on a first deviation range and a second deviation range;
    flow control means for controlling the flow of medium to each zone in response to a first of said outputs of the sensing means in that zone whereby the flow of medium to each zone is controlled by said first output through said first range; and
    first source control means for controlling the source to vary the condition changing capability of the medium in response to the second of said outputs whereby said condition changing capability of said first source is controlled by said second output through said second range.

2. The system of claim 1 wherein:
    said condition sensing means is a zone thermostat having two switches each of which are cyclically closed by an amount proportional to the conditioning of load of said zone;
    a first of said switches is connected to said flow control means whereby said first deviation increases the flow of medium to one of said zones to a predetermined amount; and
    a second of said switches is connected to said first source control means whereby as said second deviation increases the temperature of the medium from said source is changed.

3. The system of claim 2 wherein:
    said flow control means comprises damper means in a duct connecting said first source to said zone, said first switch controlling said damper from a closed to an open position through said first deviation range; and
    said source control means comprising temperature control means for maintaining the temperature of the air delivered from a temperature conditioning source between a low value and a high value through said second deviation range whereby upon said damper in a duct of one zone reaches a predetermined position a further need for a change in condition of said one zone is brought about by the change in temperature of the air delivered.

4. The system of claim 2 wherein each of said zone thermostats comprises:
    temperature responsive means responsive to each zone temperature;
    heater means for artificially heating each of said temperature responsive means; and
    means connecting each of said heater means to a source of power so that when said second switch of any zone is closed said heater means of all temperature responsive means are energized to artificially heat said thermostat and to modify the control temperature of each temperature responsive means.

5. The system of claim 4 wherein:
    third switch means connected to each damper means, said third switch means being closed where said damper means is in a predetermined position; and
    circuit means including said third switch means of each zone for connecting said heater means to said source whereby said zone thermostats are not modified by said heater means unless a respective damper means is in a predetermined position.

6. In a multizone temperature control system for a temperature-conditioning system comprising:
    a plurality of flow control means each adapted to control the supply of temperature conditioned medium from a temperature-conditioning apparatus to a respective zone;
    a plurality of temperature responsive means each adapted to be responsive to the temperature in a zone, each of said temperature responsive means having an electrical output means, a first portion of said output means being actuated when the load of the zone is at first predetermined value and a second portion of said output means being actuated when the load of the zone is at a second predetermined value;
    temperature control means adapted to control the temperature of medium delivered from the temperature-conditioning apparatus;
    means connecting said first output means of each zone to control the operation of said flow control means of a respective zone; and
    means connecting each said second output means of each zone to said temperature control means whereby upon any one of said first portion of said output means operating said flow control means of one of said zones to a predetermined open position, said second portion of said output means of said temperature responsive means of said one zone operates said temperature control means to change the temperature of the medium delivered from the temperature conditioning apparatus.

7. In the system of claim 6 wherein said temperature responsive means is adjusted whereby said first electrical output means is effective 100 percent of the time before said second electrical output means is effective.

8. In the system of claim 7 wherein said first output means is a first switch and said second output means is a second switch, and said temperature responsive means comprising a bimetal with the two switches mounted thereon, said first switch being closed 100 percent of the time before said second switch is closed to result in said flow control means of said zone to be completely energized before said temperature control means of the source is reset.

9. In the system of claim 1 wherein said first source control means controls the temperature of air for cooling said zones comprising:
    first means to control the amount of outdoor air supplied to said first source;
    second means for changing the temperature of the air of said first source; and
    means including said first control means for controlling said first means and second means in sequence whereby outdoor air is first used for cooling.